United States Patent
Cho et al.

(10) Patent No.: US 8,204,021 B2
(45) Date of Patent: Jun. 19, 2012

(54) METHOD AND APPARATUS OF SUBCHANNELIZATION IN WIRELESS COMMUNICATION SYSTEM

(75) Inventors: Han Gyu Cho, Anyang-si (KR); Jinsoo Choi, Anyang-si (KR); Jin Sam Kwak, Anyang-si (KR); Seung Hyun Kang, Anyang-si (KR); Sung Ho Moon, Anyang-si (KR)

(73) Assignee: LG Electronics Inc., Seoul (KR)

( * ) Notice: Subject to any disclaimer, the term of this patent is extended or adjusted under 35 U.S.C. 154(b) by 328 days.

(21) Appl. No.: 12/603,240

(22) Filed: Oct. 21, 2009

(65) Prior Publication Data
US 2010/0103896 A1 Apr. 29, 2010

Related U.S. Application Data

(60) Provisional application No. 61/107,349, filed on Oct. 22, 2008, provisional application No. 61/109,184, filed on Oct. 29, 2008, provisional application No. 61/121,557, filed on Dec. 11, 2008.

(30) Foreign Application Priority Data

Sep. 11, 2009 (KR) .................. 10-2009-0085669

(51) Int. Cl.
*H04W 4/00* (2009.01)

(52) U.S. Cl. ........................ 370/330; 375/260
(58) Field of Classification Search .......... 370/208–210, 370/330, 436; 375/260
See application file for complete search history.

(56) References Cited

U.S. PATENT DOCUMENTS

| | | |
|---|---|---|
| 2006/0018279 A1 | 1/2006 | Agrawal et al. |
| 2007/0201398 A1 | 8/2007 | Yang et al. |
| 2007/0206559 A1 | 9/2007 | Cho et al. |
| 2007/0217362 A1 | 9/2007 | Kashima et al. |
| 2007/0298809 A1 | 12/2007 | So |
| 2008/0013599 A1* | 1/2008 | Malladi ............... 375/132 |
| 2008/0034107 A1 | 2/2008 | Lee et al. |
| 2008/0225788 A1 | 9/2008 | Inoue et al. |
| 2008/0227481 A1 | 9/2008 | Naguib et al. |
| 2009/0262699 A1* | 10/2009 | Wengerter et al. ........ 370/330 |
| 2010/0061345 A1 | 3/2010 | Wengerter et al. |
| 2010/0068006 A1 | 3/2010 | Littlewood et al. |
| 2010/0103894 A1* | 4/2010 | Cho et al. ............... 370/329 |
| 2010/0103896 A1 | 4/2010 | Cho et al. |

(Continued)

FOREIGN PATENT DOCUMENTS

KR 10-2007-0049091 A 5/2007

(Continued)

*Primary Examiner* — Phuc Tran
(74) *Attorney, Agent, or Firm* — Birch Stewart Kolasch & Birch, LLP

(57) ABSTRACT

A method and an apparatus of subchannelization is provided. The method includes receiving information indicating the number of physical resource unit (PRU) sets allocated to a subband from a base station, and mapping PRUs of a physical region to a subband PRU or a miniband PRU in a granularity of the PRU set according to the received information, wherein the subband PRU is allocated with at least one subband comprising a first number of contiguous PRUs, the miniband PRU is allocated with at least one miniband comprising a second number of PRUs, and the PRU set comprises PRUs whose number is equal to the number of PRUs included in one subband. Subchannelization can be effectively achieved while maintaining a frequency selective scheduling gain and a frequency diversity gain to the maximum extent possible.

11 Claims, 16 Drawing Sheets

U.S. PATENT DOCUMENTS

| | | | |
|---|---|---|---|
| 2010/0165935 A1* | 7/2010 | Cho et al. | 370/329 |
| 2010/0255851 A1* | 10/2010 | Kwak et al. | 455/450 |

FOREIGN PATENT DOCUMENTS

| | | |
|---|---|---|
| KR | 10-2008-0038967 A | 5/2008 |
| KR | 10-2008-0056616 A | 6/2008 |
| KR | 10-2008-0081537 A | 9/2008 |
| KR | 10-2008-0082943 A | 9/2008 |
| WO | WO-2007/094628 A1 | 8/2007 |
| WO | WO-2007/099839 A1 | 9/2007 |

* cited by examiner

METHOD AND APPARATUS OF SUBCHANNELIZATION IN WIRELESS COMMUNICATION SYSTEM

CROSS-REFERENCE TO RELATED APPLICATIONS

This application claims the benefit of priority of U.S. Provisional application No. 61/107,349 filed on Oct. 22, 2008, U.S. Provisional application No. 61/109,184 filed on Oct. 29, 2008, U.S. Provisional application No. 61/121,557 filed on Dec. 11, 2008, and Korean Patent Application No. 10-2009-0085669 filed on Sep. 11, 2009, all of which are incorporated by reference in their entirety herein.

BACKGROUND OF THE INVENTION

1. Field of the Invention

The present invention relates to wireless communications, and more particularly, to a method and an apparatus of subchannelization.

2. Related Art

Wireless communication systems are widely spread all over the world to provide various types of communication services such as voice or data. In general, the wireless communication system is a multiple access system capable of supporting communication with multiple users by sharing available system resources (e.g., bandwidth, transmit power, etc.). Examples of the multiple access system include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, etc.

The institute of electrical and electronics engineers (IEEE) 802.16 standard provides a technique and protocol for the support of broadband wireless access. The standardization had been conducted since 1999 until the IEEE 802.16-2001 was approved in 2001. The IEEE 802.16-2001 is based on a physical layer of a single carrier (SC) called 'WirelessMAN-SC'. The IEEE 802.16a standard was approved in 2003. In the IEEE 802.16a standard, 'WirelessMAN-OFDM' and 'WirelessMAN-OFDMA' are further added to the physical layer in addition to the 'WirelessMAN-SC'. After completion of the IEEE 802.16a standard, the revised IEEE 802.16-2004 standard was approved in 2004. To correct bugs and errors of the IEEE 802.16-2004 standard, the IEEE 802.16-2004/Cor1 was completed in 2005 in a format of 'corrigendum'. A standard based on the IEEE 802.16-2004/Cor1 is referred to as IEEE 802.16e or WiMAX.

In the IEEE 802.16 broadband wireless access working group, there is ongoing standardization effort for the IEEE 802.16m standard which is a new technical standard based on the IEEE 802.16e. The IEEE 802.16e system uses a time division duplex (TDD) scheme in which a downlink (DL) and an uplink (UL) are temporally divided, whereas the IEEE 802.16m is expected to use not only the TDD scheme but also a frequency division duplex (FDD) scheme in which the DL and the UL are spectrally divided. Furthermore, in order to improve a transfer rate, a frame of the IEEE 802.16m system is designed by considering bandwidth expansion, decrease in a cyclic prefix (CP) size, transmission in a subframe unit in which a frame is divided into a plurality of subframes, mapping of a resource unit in a multi-cell environment, etc.

A resource unit is classified into a physical resource unit (PRU) and a logical resource unit (LRU). The PRU is a basic physical unit for allocating resources including a plurality of contiguous subcarriers×a plurality of contiguous orthogonal frequency division multiplexing (OFDM) symbols. The LRU is a basic logical unit for allocating distributed and contiguous resources.

Meanwhile, in a frequency domain, the resource unit may be spread along a frequency axis according to a predetermined permutation rule which is designed to obtain a frequency diversity gain. Permutation implies mapping of one set of resource units onto same-sized another set of resource units. Mapping of a resource unit is a method in which a PRU is mapped to a contiguous resource unit (CRU) and a distributed resource unit (DRU) in the frequency domain and the CRU and the DRU are allocated to a cell (or sector) specific resource by dividing the CRU and the DRU into one or more frequency partitions. Alternatively, permutation may imply an operation of allocating an index of a PRU to an index of an LRU. In this case, each index can be allocated one time. Permutation can be performed in a resource unit having a specific granularity. The less the size of the granularity, the greater the frequency diversity gain resulted from permutation.

Hereinafter, contiguous PRUs will be referred to as a PRU set or a subband. One subband includes a plurality of contiguous PRUs in the frequency domain, and is suitable for frequency selective allocation. A frequency band corresponding to one subband can be allocated to an optimal frequency channel for a user equipment. For example, one subband may include 4 contiguous PRUs. A miniband includes a less number of PRUs than the subband. That is, a granularity size of the miniband is less than a granularity size of the subband. The miniband is permutated in the frequency domain, and is suitable for frequency diverse allocation. For example, one miniband may consist of one PRU.

SUMMARY OF THE INVENTION

When assuming fractional frequency reuse (FFR), a full frequency band is divided into a plurality of frequency bands, and a distributed subchannel and a localized subchannel coexist in a frequency division multiplexing (FDM) manner.

Accordingly, the present invention provides a method and an apparatus of effective subchannelization under an environment where each frequency band has a different-sized granularity.

According to an aspect of the present invention, a method of subchannelization is provided. The method includes receiving information indicating the number of physical resource unit (PRU) sets allocated to a subband from a base station; and mapping PRUs of a physical region to a subband PRU or a miniband PRU in a granularity of the PRU set according to the received information, wherein the subband PRU is allocated with at least one subband comprising a first number of contiguous PRUs, the miniband PRU is allocated with at least one miniband comprising a second number of PRUs, and the PRU set comprises PRUs whose number is equal to the number of PRUs included in one subband. The information is the number of PRU sets allocated to the subband or a predetermined count indicating this number. The predetermined count is expressed with a bit-stream. A length of the bit-stream is determined based on a frequency bandwidth. The information is received through a broadcast channel. The information is received through a superframe header (SFH). The subchannelization method further includes performing permutation on the miniband PRU in a PRU granularity.

According to another aspect of the present invention, a data transmission method of a user equipment in a wireless communication system is provided. The method includes receiving information indicating the number of PRU sets allocated to a subband from a base station; mapping a subband PRU and a miniband PRU to a PRU of a physical region in a granularity of the PRU set on the basis of the received information; and transmitting uplink data by using the PRU of the physical region, wherein the subband PRU is allocated with at least one subband comprising a first number of contiguous PRUs, the miniband PRU is allocated with at least one miniband comprising a second number of PRUs, and the PRU set comprises PRUs whose number is equal to the number of PRUs included in one subband.

According to another aspect of the present invention, a data processing method of a user equipment in a wireless communication system is provided. The method includes receiving information indicating the number of PRU sets allocated to a subband from a base station; receiving downlink data from the base station by using a PRU of a physical region; and mapping the PRU of the physical region to a subband PRU and a miniband PRU in a granularity of the PRU set on the basis of the received information, wherein the subband PRU is allocated with at least one subband comprising a first number of contiguous PRUs, the miniband PRU is allocated with at least one miniband comprising a second number of PRUs, and the PRU set comprises PRUs whose number is equal to the number of PRUs included in one subband. The data processing method further includes performing permutation on the miniband in a PRU granularity.

According to another aspect of the present invention, a user equipment is provided. The user equipment includes a processor; and a radio frequency (RF) unit, coupled to the processor, for transmitting and receiving a radio signal, wherein the processor receives information indicating the number of physical resource unit (PRU) sets allocated to a subband from a base station, and maps PRUs of a physical region to a subband PRU or a miniband PRU in a granularity of the PRU set according to the received information, wherein the subband PRU is allocated with at least one subband comprising a first number of contiguous PRUs, the miniband PRU is allocated with at least one miniband comprising a second number of PRUs, and the PRU set comprises PRUs whose number is equal to the number of PRUs included in one subband.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. IEEE 802.16m is an evolution of IEEE 802.16e.

Although the following description will focus on the IEEE 802.16m for clarity of explanation, the technical features of the present invention are not limited thereto.

Figure 1:
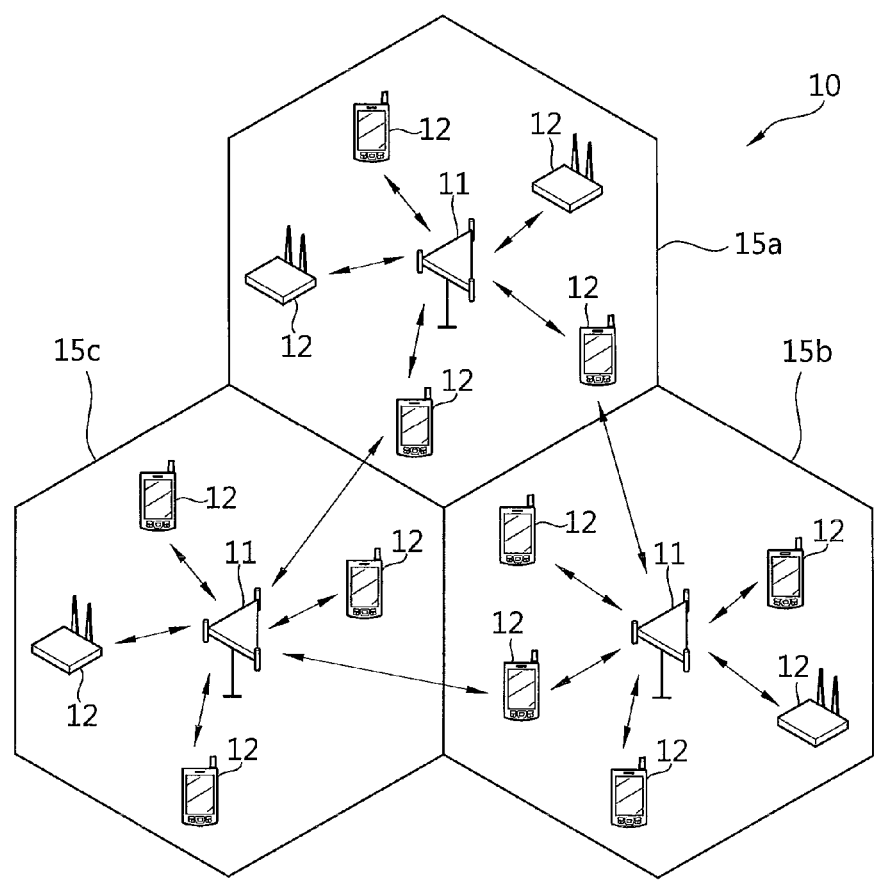
FIG. 1 shows a wireless communication system.

FIG. 1 shows a wireless communication system.

Referring to FIG. 1, a wireless communication system 10 includes at least one base station (BS) 11. Respective BSs 11 provide communication services to specific geographical regions (generally referred to as cells) 15a, 15b, and 15c. Each cell can be divided into a plurality of regions (referred to as sectors). A mobile station (MS) 12 may be fixed or mobile, and may be referred to as another terminology, such as a user equipment (UE), a user terminal (UT), a subscriber station (SS), a wireless device, a personal digital assistant (PDA), a wireless modem, a handheld device, etc. The BS 11 is generally a fixed station that communicates with the MS 12 and may be referred to as another terminology, such as an evolved node-B (eNB), a base transceiver system (BTS), an access point, etc.

An MS belongs to one cell. A cell to which the MS belongs is referred to as a serving cell. A BS providing a communication service to the serving cell is referred to as a serving BS. Since a wireless communication system is a cellular system, there is another cell adjacent to the serving cell. The cell adjacent to the serving cell is referred to as a neighbor cell. A BS providing a communication service to the neighbor cell is referred to as a neighbor BS. The serving cell and the neighbor cell are determined relatively with respect to the MS.

Hereinafter, downlink (DL) denotes communication from the BS to the MS, and uplink (UL) denotes communication from the MS to the BS. In the DL, a transmitter may be a part of the BS, and a receiver may be a part of the MS. In the UL, the transmitter may be a part of the MS, and the receiver may be a part of the BS.

As a duplex scheme, the wireless communication system can use a time division duplex (TDD) scheme, a frequency division duplex (FDD) scheme, or a half-duplex FDD (H-FDD) scheme.

Figure 2:
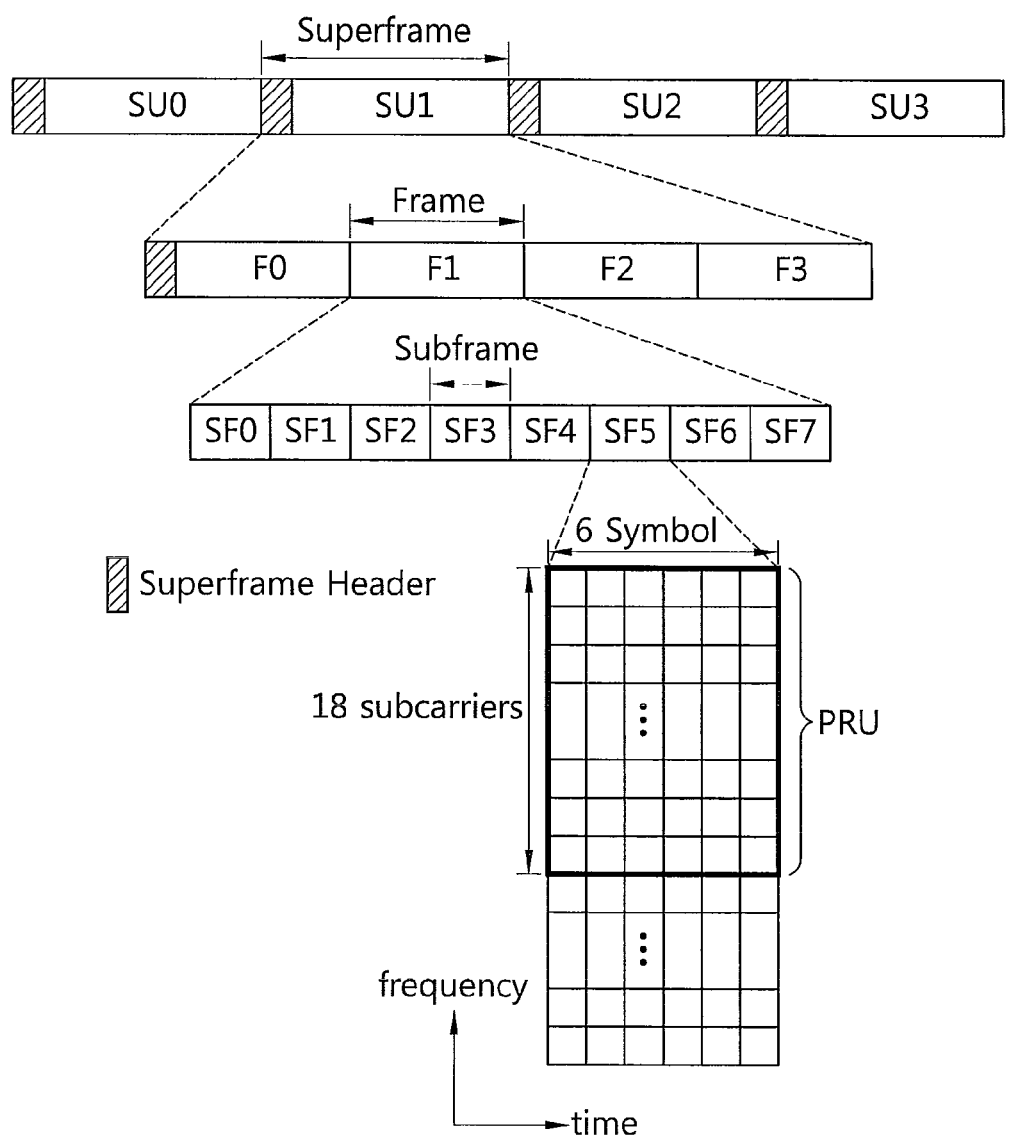
FIG. 2 shows an example of a superframe structure in an institute of electrical and electronics engineers (IEEE) 802.16m system.

FIG. 2 shows an example of a superframe structure in an IEEE 802.16m system.

Referring to FIG. 2, each of superframes SU0, SU1, SU2, and SU3 includes a superframe header (SFH) and four frames F0, F1, F2, and F3. Each frame may have the same length in the superframe. For example, the superframe may have a size of 20 milliseconds (ms), and each frame may have a size of 5 ms. One frame includes 8 subframes SF0, SF1, ..., SF7. Each subframe can be allocated for DL transmission or UL transmission.

The SFH can carry an essential system parameter and system configuration information. The SFH may be located in a first subframe of the superframe. The SFH can be classified into a primary-SFH (P-SFH) and a secondary-SFH (S-SFH). The P-SFH is transmitted in every superframe. The S-SFH may be transmitted in every superframe. The SFH may include a broadcast channel.

The superframe structure is for exemplary purposes only. A length of the superframe, the number of frames included in the superframe, the number of subframes included in the frame, etc., may change variously. The number of subframes included in the frame may change variously according to a channel bandwidth and a cyclic prefix (CP) length.

One subframe includes a plurality of orthogonal frequency division multiplexing (OFDM) symbols in a time domain, and includes a plurality of subcarriers in a frequency domain.

An OFDM symbol is for representing one symbol period, and can be referred to as other terminologies such as an OFDMA symbol, an SC-FDMA symbol, etc., according to a multiple access scheme. Although it is described herein that one subframe includes 6 OFDM symbols S0, S1, ..., S5, this is for exemplary purposes only, and thus the number of OFDM symbols included in the subframe is not limited thereto. The number of OFDM symbols included in the subframe may change variously according to a channel bandwidth and a CP length. A subframe type may be defined according to the number of OFDM symbols included in the subframe. For example, it can be defined such that a type-1 subframe includes 6 OFDM symbols, a type-2 subframe includes 7 OFDM symbols, a type-3 subframe includes 5 OFDM symbols, and a type-4 subframe includes 9 OFDM symbols. One frame may include subframes each having the same type. Alternatively, one frame may include subframes each having a different type. That is, the number of OFDM symbols included in each subframe may be identical or different in one frame. Alternatively, the number of OFDM symbols included in at least one subframe of one frame may be different from the number of OFDM symbols of the remaining subframes of the frame.

One OFDM symbol includes a plurality of subcarriers, and the number of subcarriers is determined according to a fast Fourier transform (FFT) size. There are several types of subcarriers. A subcarrier type may include a data subcarrier for data transmission, a pilot subcarrier for various estimations, and a null carrier for a guard band and a DC carrier. A parameter for characterizing an OFDM symbol includes BW, $N_{used}$, n, G, etc. BW denotes a nominal channel bandwidth. $N_{used}$ denotes the number of subcarriers in use (including a DC subcarrier). n denotes a sampling factor. This parameter is used to determine a subcarrier spacing and a useful symbol time together with BW and $N_{used}$. G denotes a ratio of a CP time and a useful time.

TABLE 1

| The nominal channel bandwidth, BW (MHz) | | | 5 | 7 | 8.75 | 10 | 20 |
|---|---|---|---|---|---|---|---|
| Sampling factor, n | | | 28/25 | 8/7 | 8/7 | 28/25 | 28/25 |
| Sampling frequency, $F_s$ (MHz) | | | 5.6 | 8 | 10 | 11.2 | 22.4 |
| FFT size, $N_{FFT}$ | | | 512 | 1024 | 1024 | 1024 | 2048 |
| Subcarrier spacing, $\Delta f$ (kHz) | | | 10.94 | 7.81 | 9.77 | 10.94 | 10.94 |
| Useful symbol time, $T_b$ (μs) | | | 91.4 | 128 | 102.4 | 91.4 | 91.4 |
| CP ratio, G = 1/8 | OFDMA symbol time, $T_s$ (μs) | | 102.857 | 144 | 115.2 | 102.857 | 102.857 |
| | FDD | Number of OFDMA symbols per 5 ms frame | 48 | 34 | 43 | 48 | 48 |
| | | Idle time (μs) | 62.857 | 104 | 46.40 | 62.857 | 62.857 |
| | TDD | Number of OFDMA symbols per 5 ms frame | 47 | 33 | 42 | 47 | 47 |
| | | TTG + RTG (μs) | 165.714 | 248 | 161.6 | 165.714 | 165.714 |
| CP ratio, G = 1/16 | OFDMA symbol time, $T_s$ (μs) | | 97.143 | 136 | 108.8 | 97.143 | 97.143 |
| | FDD | Number of OFDMA symbols per 5 ms frame | 51 | 36 | 45 | 51 | 51 |
| | | Idle time (μs) | 45.71 | 104 | 104 | 45.71 | 45.71 |
| | TDD | Number of OFDMA symbols per 5 ms frame | 50 | 35 | 44 | 50 | 50 |
| | | TTG + RTG (μs) | 142.853 | 240 | 212.8 | 142.853 | 142.853 |
| CP ratio, G = 1/4 | OFDMA symbol time, $T_s$ (μs) | | 114.286 | 160 | 128 | 114.286 | 114.286 |
| | FDD | Number of OFDMA symbols per 5 ms frame | 43 | 31 | 39 | 43 | 43 |
| | | Idle time (μs) | 85.694 | 40 | 8 | 85.694 | 85.694 |
| | TDD | Number of OFDMA symbols per 5 ms frame | 42 | 30 | 38 | 42 | 42 |
| | | TTG + RTG (μs) | 199.98 | 200 | 136 | 199.98 | 199.98 |

TABLE 1-continued

| Number of Guard Sub-Carriers | Left | 40 | 80 | 80 | 80 | 160 |
|---|---|---|---|---|---|---|
| | Right | 39 | 79 | 79 | 79 | 159 |
| Number of Used Sub-Carriers | | | 433 | 865 | 865 | 865 | 1729 |
| Number of Physical Resource Unit (18 × 6) in a type-1 sub-frame. | | | 24 | 48 | 48 | 48 | 96 |

In Table 1, $N_{FFT}$ is smallest power of two greater than $N_{used}$. A sampling factor $F_s$ is floor (n · BW/8000) × 8000, a subcarrier spacing $\Delta f$ is $F_s/N_{FFT}$, a useful symbol time $T_b$ is $1/\Delta$, a CP time $T_g$ is $G \cdot T_b$, an OFDMA symbol time $T_s$ is $T_b + T_g$, and a sampling time is $T_b/N_{FFT}$.

A subframe includes a plurality of physical resource units (PRUs) in the frequency domain. The PRU is a basic physical unit for resource allocation, and consists of a plurality of consecutive OFDM symbols in the time domain and a plurality of consecutive subcarriers in the frequency domain. For example, the number of subcarriers may be 18 in the PRU. The number of OFDM symbols included in the PRU is equal to the number of OFDM symbols included in one subframe. Therefore, the number of OFDM symbols in the PRU can be determined according to a subframe type. For example, when one subframe consists of 6 OFDM symbols, the PRU may be defined with 18 subcarriers and 6 OFDM symbols.

Figure 3:
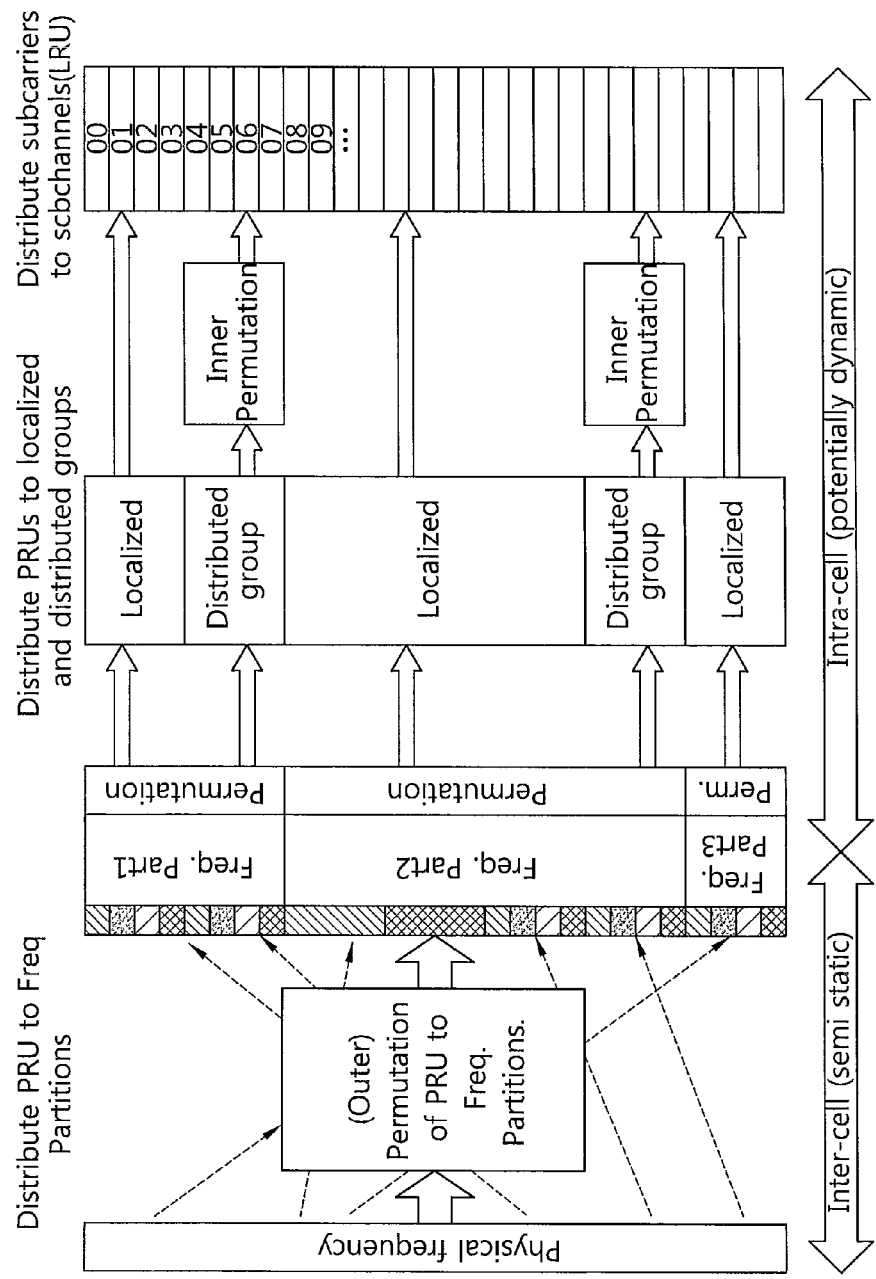
FIG. 3 shows an example of a procedure for mapping a resource unit.

FIG. 3 shows an example of a procedure for mapping a resource unit. Each PRU includes a pilot and a data subcarrier.

Referring to FIG. 3, outer permutation is performed on a physical PRU. The outer permutation is applied in a granularity of at least one PRU. The outer permutation may be performed in a granularity of $N_1$ or $N_2$ PRUs (where $N_1 > N_2$), and $N_1$ and $N_2$ may vary depending on a bandwidth. For effective outer permutation, $N_1$ needs to be an integer multiple of $N_2$. The outer permutation may imply a process including a step of dividing a PRU into a subband PRU (hereinafter also referred to as $PRU_{SB}$) and a miniband PRU (hereinafter also referred to as $PRU_{MB}$) such as subband partitioning, and a step of performing permutation on the miniband PRU in a PRU granularity such as miniband permutation. A $PRU_{SB}$ is a PRU to be allocated to a subband, and a $PRU_{MB}$ is a PRU to be allocated to a miniband.

Next, reordered PRUs are distributed to one or more frequency partitions. The frequency partition is divided into a logical CRU (LCRU) and a logical DRU (LDRU) with respect to each resource. Sector specific permutation can be supported, and direct mapping of resources can be supported for contiguous resources. A size of distributed/contiguous resource can be set flexibly for each sector.

Next, a contiguous group and a distributed group are mapped to an LRU.

Inner permutation (or subcarrier permutation) defined for distributed resource allocation in one frequency partition enables spreading of subcarriers of a distributed resource unit in all distributed resources. A granularity of the inner permutation is identical to a basic unit for constituting a distributed resource unit. Subchannelization for distributed resources enables spreading of subcarriers of the LRU for the all distributed resources.

There is no inner permutation for contiguous resource allocation. A PRU is directly mapped to a contiguous resource unit in each frequency partition.

Meanwhile, a fractional frequency reuse (FFR) scheme can be used in a cellular system having multiple cells. The FFR scheme divides a full frequency band into a plurality of frequency partitions (FPs), and allocates the FP to each cell. According to the FFR scheme, different FPs can be allocated between neighbor cells, and the same FP can be allocated between cells separated far from another. Therefore, inter-cell interference (ICI) can be reduced, and performance of a user equipment located in a cell edge can be increased.

Figure 4:
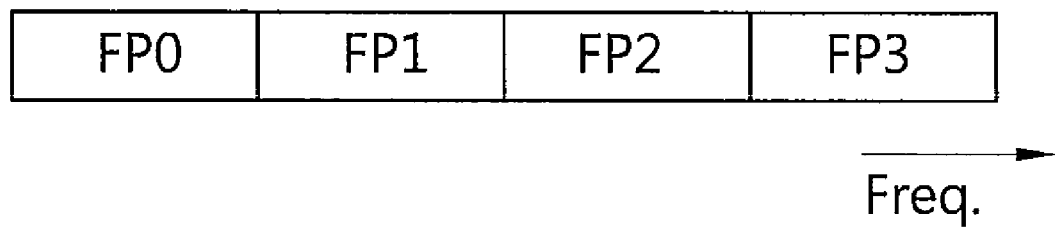
FIG. 4 shows an example of a method of dividing a full frequency band into a plurality of frequency partitions.

FIG. 4 shows an example of a method of dividing a full frequency band into a plurality of FPs.

Referring to FIG. 4, the full frequency band is divided into a first FP (i.e., FP0), a second FP (i.e., FP1), a third FP (i.e., FP2), and a fourth FP (i.e., FP3). Each FP can be physically or logically divided from the full frequency band.

Figure 5:
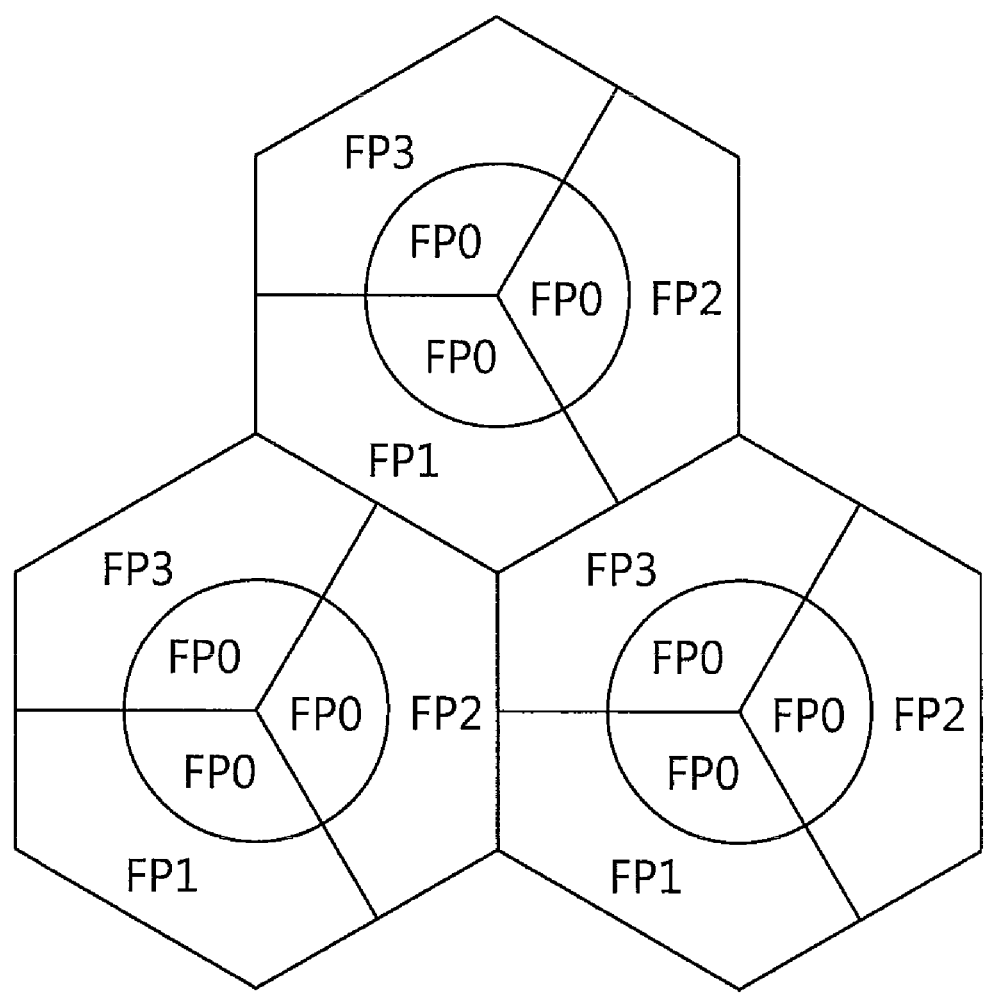
FIG. 5 shows an example of a cellular system using a fractional frequency reuse (FFR) scheme.

FIG. 5 shows an example of a cellular system using an FFR scheme.

Referring to FIG. 5, each cell is divided into an inner cell and a cell edge. Further, each cell is divided into three sectors. It is assumed that a full frequency band is divided into three FPs (i.e., FP1, FP2, and FP3), and a first FP (i.e., FP0) consists of the second FP (i.e., FP1), the third PF (i.e., FP2), and the fourth FP (i.e., FP3). That is, the first FP (i.e., FP0) is identical to the full frequency band.

The first FP (i.e., FP0) is allocated in the inner cell. Any one of the second FP (i.e., FP1) to the fourth FP (i.e., FP3) is allocated in each sector of the cell edge. In this case, different FPs are allocated between neighbor cells. Hereinafter, an allocated FP is referred to as an active FP, and an unallocated FP is referred to as an inactive FP. For example, when the second FP (i.e., FP1) is allocated, the second FP is an active FP, and the third FP (i.e., FP2) and the fourth FP (i.e., FP3) are inactive FPs.

A frequency reuse factor (FRF) can be defined as the number of cells (or sectors) into which the full frequency band can be divided. In this case, the FRF may be 1 in the inner cell, and may be 3 in each sector of the cell edge.

Figure 6:
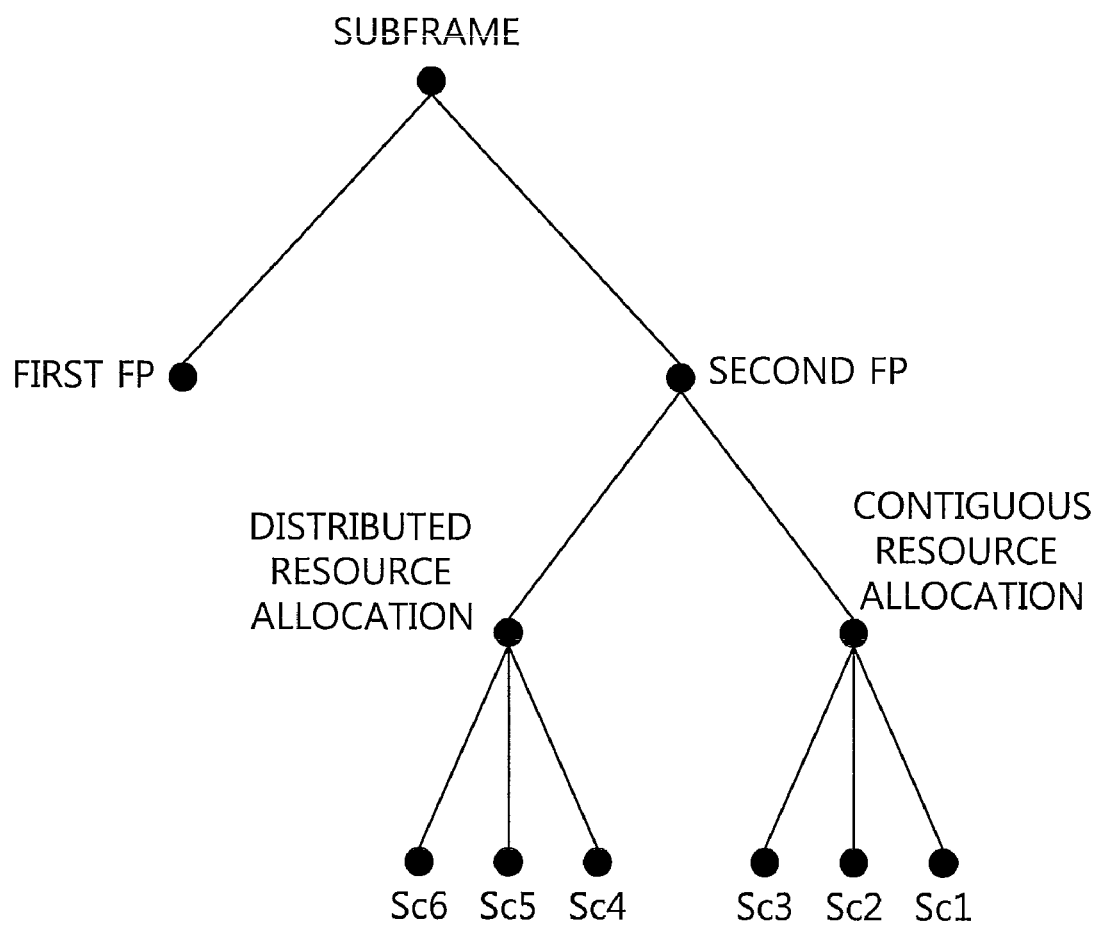
FIG. 6 shows an example of a physical structure of a downlink subframe in an IEEE 802.16m system.

FIG. 6 shows an example of a physical structure of a downlink subframe in an IEEE 802.16m system.

Referring to FIG. 6, the downlink subframe can be divided into at least one frequency partition (FP). Herein, the subframe is divided into two FPs (i.e., FP1 and FP2) for example. However, the number of FPs included in the subframe is not limited thereto. Each FP can be used for other purposes such as FFR.

Each FP consists of at least one PRU. Each FP may include distributed resource allocation and/or contiguous resource allocation. Herein, the second FP (i.e., FP2) includes the distributed resource allocation and the contiguous resource allocation. 'Sc' denotes a subcarrier. A logical resource unit (LRU) is a basic logical unit for the distributed resource allocation and the contiguous resource allocation.

A logical distributed (non-contiguous) resource unit (LDRU) includes a subcarrier group spread across distributed resource allocation in one FP. A size of the LDRU is the same as a size of a PRU. A logical contiguous (localized) resource unit (LCRU) includes a subcarrier group contiguous across resource allocation in one FP. A size of the LCRU is the same as the size of the PRU.

Figure 7:
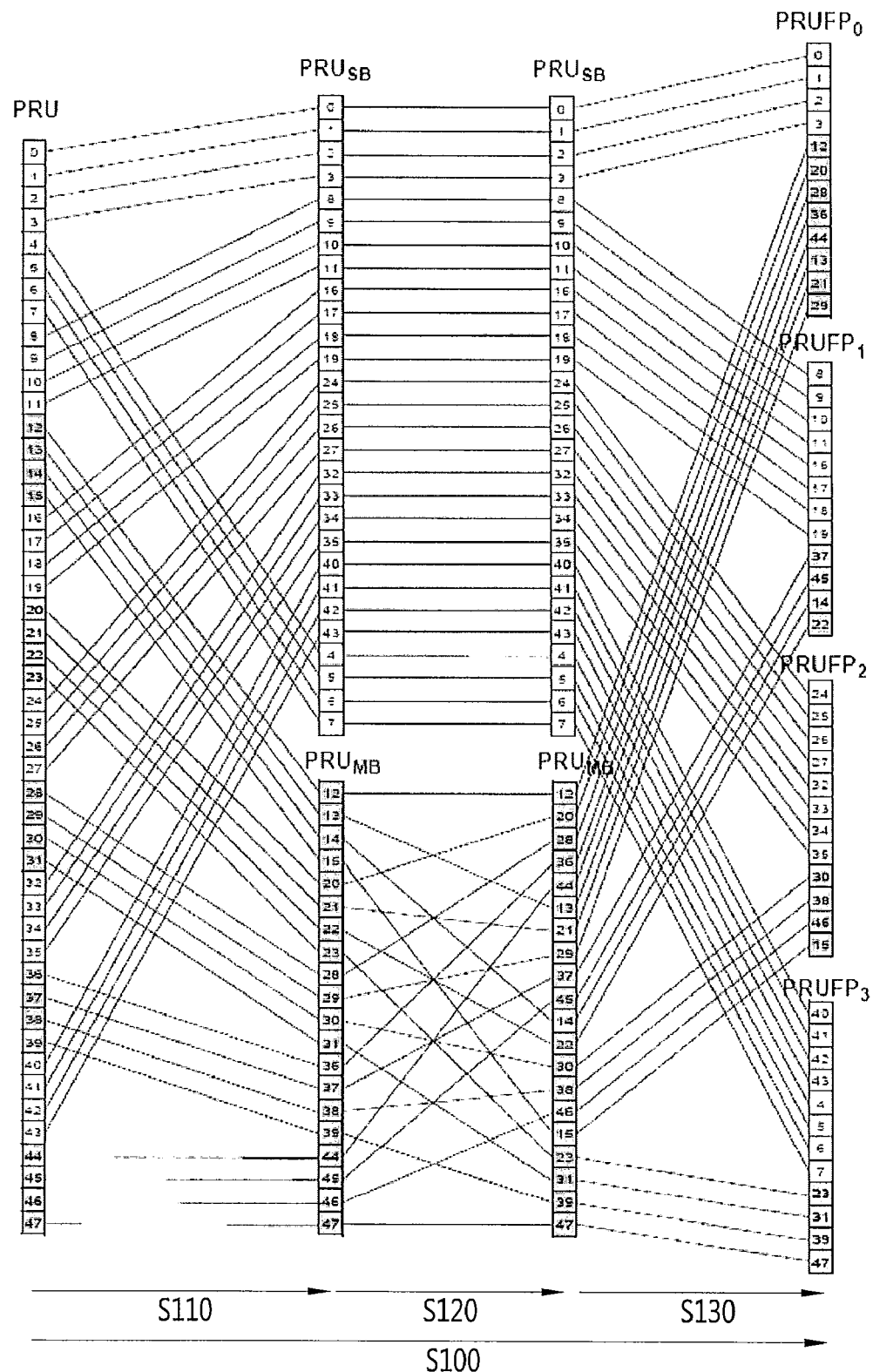
FIG. 7 shows an example of a method of mapping between a physical resource unit (PRU) and a frequency partition.

FIG. 7 shows an example of a method of mapping between a PRU and an FP.

Referring to FIG. 7, a subframe includes 48 PRUs in a frequency domain. The 48 PRUs are divided into four FPs, i.e., FP1, FP2, PF3, and PF4 (step S100). The PRUs are divided into subbands and minibands according to a predetermined resource mapping rule (step S110). A subband is a granularity of contiguous PRUs in the frequency domain. A size of the subband in the frequency domain may be 4 PRUs. A miniband is a granularity of a distributed PRU or a unit for constituting an LDRU. A size of the miniband in the frequency domain may be one PRU or an integer multiple of the PRU. A PRU may be allocated to a subband and a miniband by being selected in a granularity of 4 PRUs, i.e., the size of the subband. A PRU belonging to the subband (i.e., a subband PRU) is referred to as a $PRU_{SB}$, and a PRU belonging to the miniband (i.e., a miniband PRU) is referred to as a $PRU_{MB}$. The number of PRUs is equal to a sum of the number of $PRU_{SB}$s and the number of $PRU_{MB}$s. The $PRU_{SB}$s of the subband and the $PRU_{MB}$s of the miniband are reordered. The $PRU_{SB}$ of the subband is numbered from 0 to (the number of $PRU_{SB}$s−1). The $PRU_{MB}$ of the miniband is numbered from 0 to (the number of $PRU_{MB}$s−1).

The $PRU_{MB}$ of the miniband is subjected to miniband permutation so that it can be permutated in the frequency domain in order to guarantee frequency diversity in each FP (step S120). That is, the numbered $PRU_{MB}$ is permutated according to a predetermined permutation (or mapping) rule and thus becomes a permutated $PRU_{MB}$ ($PPRU_{MB}$).

Some PRUs of the $PRU_{SB}$ of the subband and some PRUs of the $PRU_{MB}$ of the miniband are mapped to each FP (i.e., FP1, FP2, FP3, and FP4) (step S130). Thereafter, CRU/DRU allocation is performed for each FP.

Figure 8:
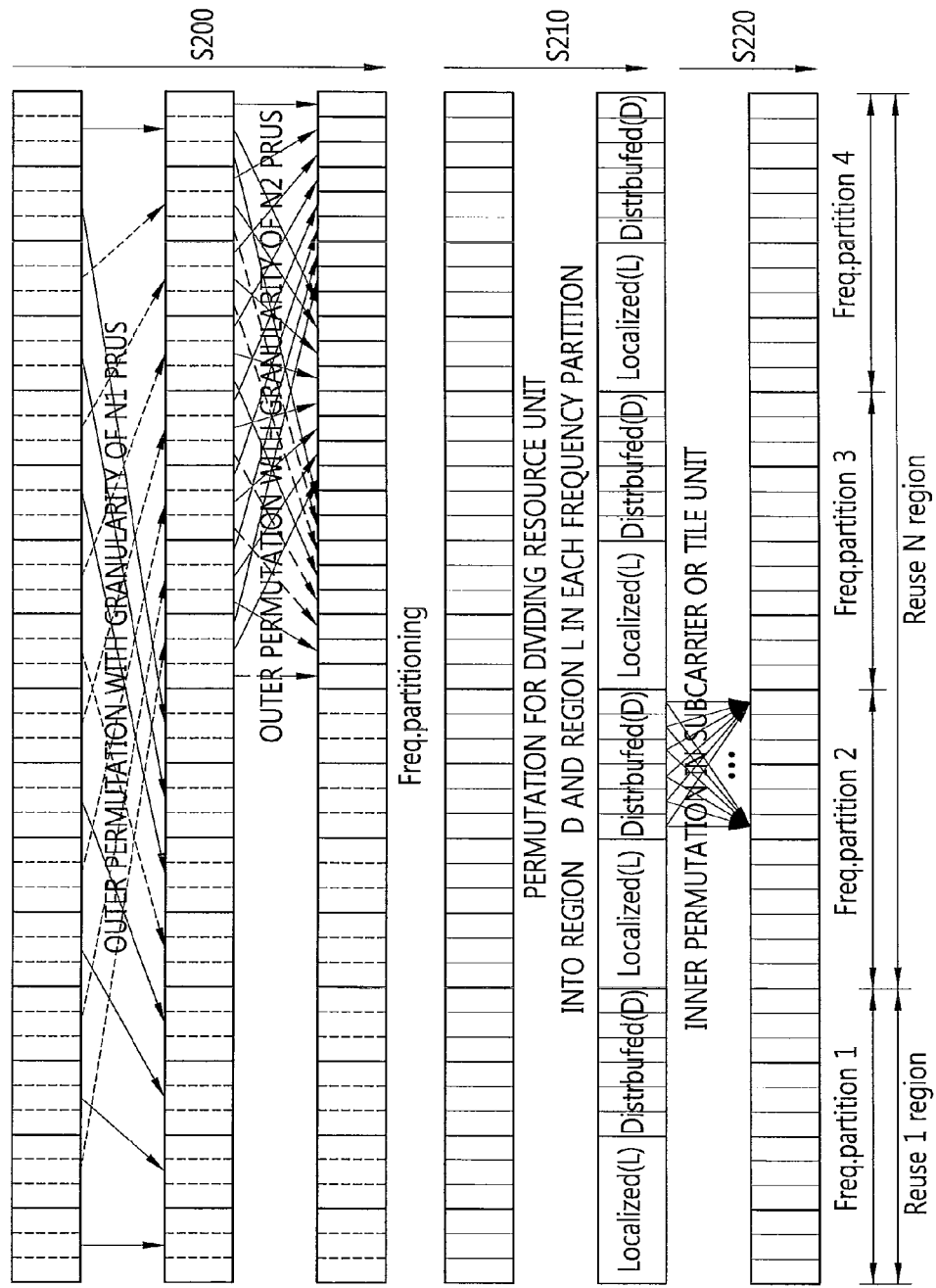
FIG. 8 is a diagram for explaining a method of subchannelization according to an embodiment of the present invention.

FIG. 8 is a diagram for explaining a method of subchannelization according to an embodiment of the present invention. First, there are several factors to be considered for subchannelization. Examples of the factors to be considered for subchannelization include DRU and CRU performance, signaling overhead for resource allocation, channel quality indicator (CQI) feedback overhead, flexibility of a ratio between a distributed resource and a contiguous resource, easiness of scaling depending on bandwidth (BW), easiness of designing a resource allocation order, easiness of FFR configuration, etc. For convenience of explanation, it is assumed that a full frequency band is 10 MHz, the total number of PRUs is 48, $N_1$ is 4, the number of resource units having a granularity of $N_1$ is 6, and the number of resource units having a granularity of $N_2$ is 24.

Referring to FIG. 8, a PRU of a physical region is divided into a subband PRU or a miniband PRU of a logical region by performing outer permutation with a granularity of $N_1$, and permutation is performed on the miniband PRU in a PRU granularity (i.e., a granularity of $N_2$) (step S200). This process corresponds to step S110 and step S120 of FIG. 7.

The subband PRU or the miniband PRU is distributed over each frequency partition, and permutation for identifying a localized region L and a distributed region D is performed in each frequency partition (step S210). A process of distributing the subband PRU or the miniband PRU over each frequency partition may be performed by being included in the outer permutation process of step S200 or may be independently performed. If this process is performed independently, the process may be performed based on frequency partition information which is broadcast by using an SFH or may be performed based on an additional distribution rule.

Additional inner permutation (or subcarrier permutation) for obtaining a diversity gain is performed for the distributed region (step S220).

Figure 9:
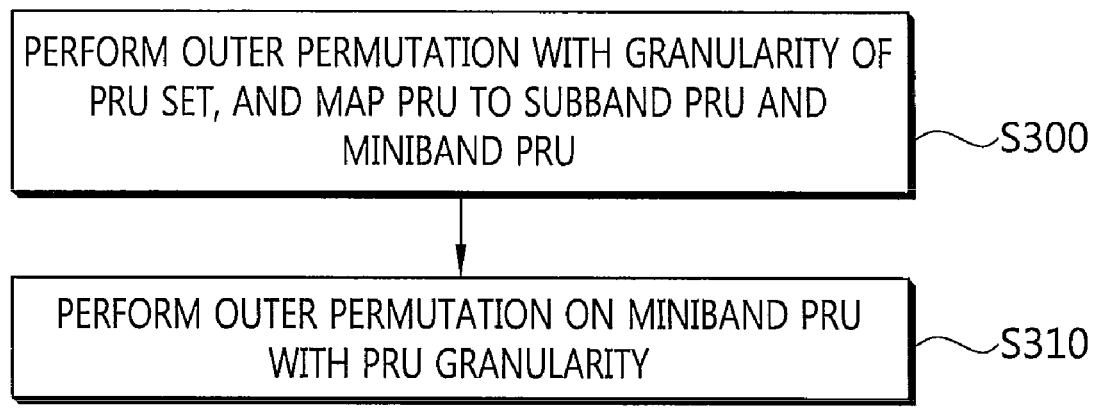
FIG. 9 is a flowchart showing a detailed process of step S200 of FIG. 8 for performing outer permutation in the method of subchannelization described in FIG. 8.

FIG. 9 is a flowchart showing a detailed process of step S200 of FIG. 8 for performing outer permutation in the method of subchannelization described in FIG. 8.

Referring to FIG. 9, outer permutation is performed on PRUs of a physical region in a granularity of a PRU set, and the PRUs are mapped to a subband PRU and a miniband PRU (step S300). The PRU set includes a specific number of PRUs contiguous in a frequency domain. The number of PRUs included in one PRU set is equal to the number of PRUs included in one subband. Since the outer permutation of step S300 is performed in a granularity of a PRU set, if one subband includes $N_1$ PRUs and one miniband includes $N_2$ PRUs, $N_1$ is a multiple of $N_2$. For example, if a full frequency band includes 24 PRUs and if $N_1$=4, some of 6 PRUs are mapped to a subband PRU, and the remaining PRUs are mapped to a miniband PRU. This process corresponds to step S110 of FIG. 7.

Next, outer permutation is performed on the miniband PRU in a PRU granularity (step S310). This process corresponds to step S120 of FIG. 7.

Figure 10:
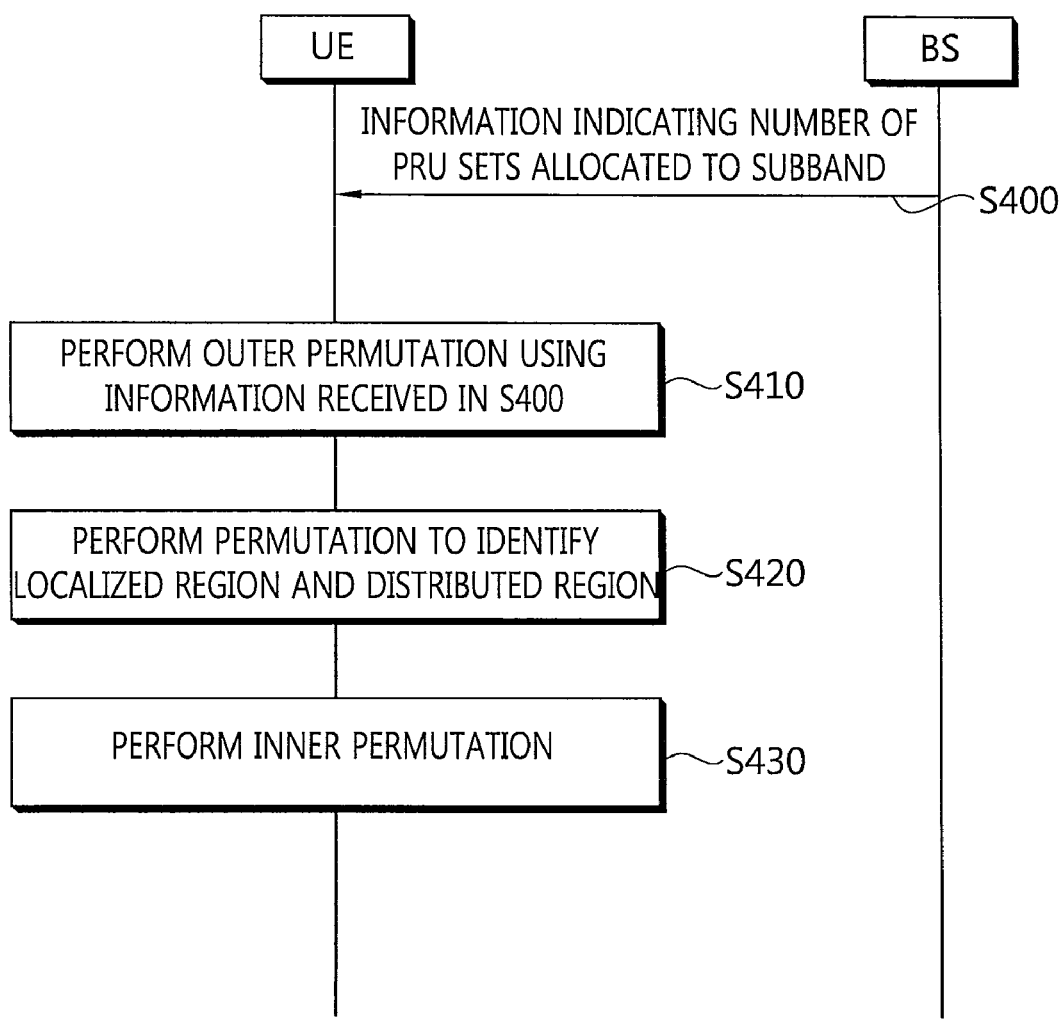
FIG. 10 is a flowchart showing a method of subchannelization according to an embodiment of the present invention.

FIG. 10 is a flowchart showing a method of subchannelization according to an embodiment of the present invention.

Referring to FIG. 10, a UE receives information from a BS, and the information indicates the number of PRU sets allocated to a subband (step S400). A PRU set allocated to the subband implies a PRU set mapped to a subband PRU. The information indicating the number of PRU sets allocated to the subband may be the number of PRU sets allocated to the subband or may be a predetermined count indicating this number.

For example, the UE and the BS may share a relationship between the number of PRU sets allocated to the subband and the predetermined count indicating this number. Further, when the BS reports the predetermined count to the UE, the UE can know the number of PRU sets allocated to the subband. Table 2 shows an example of the predetermined count shared between the UE and the BS when a frequency bandwidth is 20 MHz.

TABLE 2

| DSAC | # of subbands allocated ($K_{SB}$) |
|---|---|
| 0 | 0 |
| 1 | 1 |
| 2 | 2 |
| 3 | 3 |
| 4 | 4 |
| 5 | 5 |
| 6 | 6 |
| 7 | 7 |
| 8 | 8 |
| 9 | 9 |
| 10 | 10 |
| 11 | 11 |
| 12 | 12 |
| 13 | 13 |
| 14 | 14 |
| 15 | 15 |
| 16 | 16 |
| 17 | 17 |
| 18 | 18 |
| 19 | 19 |
| 20 | 20 |
| 21 | 21 |
| 22 | N.A. |
| 23 | N.A. |
| 24 | N.A. |
| 25 | N.A. |
| 26 | N.A. |
| 27 | N.A. |
| 28 | N.A. |
| 29 | N.A. |
| 30 | N.A. |
| 31 | N.A. |

A downlink subband allocation count (DSAC) denotes the predetermined count, and $K_{SB}$ denotes the number of subbands to be allocated.

Table 3 shows an example of the predetermined count shared between the UE and the BS when the frequency bandwidth is 10 MHz.

TABLE 3

| DSAC | # of subbands allocated ($K_{SB}$) |
|---|---|
| 0 | 0 |
| 1 | 1 |
| 2 | 2 |
| 3 | 3 |
| 4 | 4 |
| 5 | 5 |
| 6 | 6 |
| 7 | 7 |
| 8 | 8 |
| 9 | 9 |
| 10 | N.A. |
| 11 | N.A. |
| 12 | N.A. |
| 13 | N.A. |
| 14 | N.A. |
| 15 | N.A. |

Table 4 shows an example of the predetermined count shared between the UE and the BS when the frequency bandwidth is 5 MHz.

TABLE 4

| DSAC | # of subbands allocated (KSB) |
|---|---|
| 0 | 0 |
| 1 | 1 |
| 2 | 2 |
| 3 | 3 |
| 4 | N.A. |
| 5 | N.A. |
| 6 | N.A. |
| 7 | N.A. |

The predetermined count can be expressed by a bit-stream having a specific length. The length of the bit-stream may differ depending on a frequency bandwidth. For example, the predetermined count may be expressed with 3 bits if the frequency bandwidth is 5 MHz, may be expressed with 4 bits if the frequency bandwidth is 10 MHz, and may be expressed with 5 bits if the frequency bandwidth is 20 MHz.

The information indicating the number of PRU sets allocated to the subband may be broadcast from the BS through a broadcast channel. The broadcast channel is included in a superframe header. Alternatively, the information may be transmitted from the BS through a multicast service channel or a region for transmitting data commonly to all UEs using a unicast service control channel.

The UE performs outer permutation by using the information received from the BS and indicating the number of PRU sets allocated to the subband (step S410). The outer permutation can be divided into two steps. First, outer permutation is performed on PRUs of a physical region in a granularity of a PRU set, and the PRUs are divided into a subband PRU and a miniband PRU. Next, outer permutation is performed on the miniband PRU in a PRU granularity.

The subband PRU or the miniband PRU is distributed over each frequency partition, and is permutated in each frequency partition to identify a localized region L and a distributed region D (step S420).

Additional inner permutation (or subcarrier permutation) is performed on the distributed region to obtain a diversity gain (step S430).

Hereinafter, a method of mapping PRUs to a subband PRU and a miniband PRU in step S410 of FIG. 10 will be described.

Figure 11:
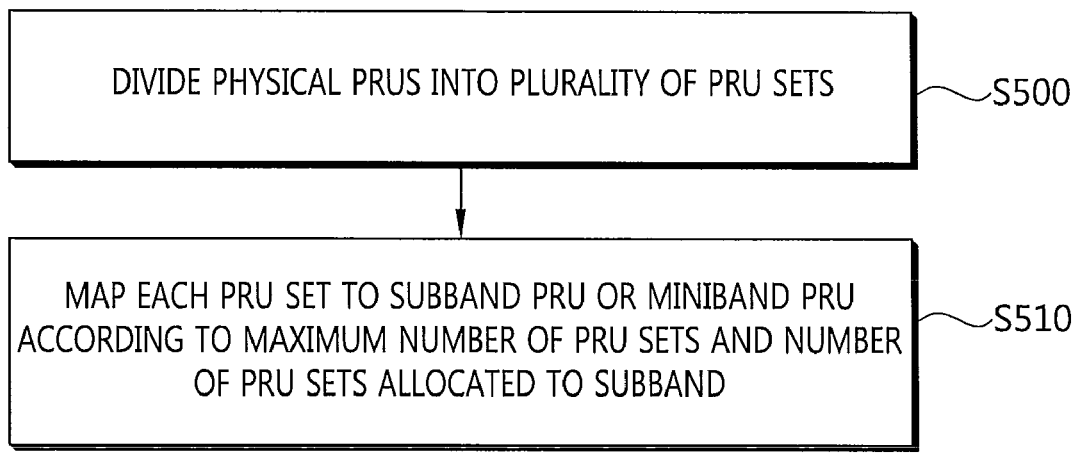
FIG. 11 is a flowchart showing an example of a procedure of mapping PRUs of a physical region to a subband PRU and a miniband PRU.

FIG. 11 is a flowchart showing an example of a procedure of mapping PRUs of a physical region to a subband PRU and a miniband PRU.

Referring to FIG. 11, PRUs are divided into a plurality of PRU sets in a full frequency band (step S500). Each PRU set includes at least one PRU. For example, each PRU set may include $N_1$ PRUs. Each PRU set may be allocated for a subband or a miniband. One subband may include $N_1$ (hereinafter also referred to as a first number) contiguous PRUs. One miniband may include $N_2$ (hereinafter also referred to as a second number) contiguous PRUs. For example, $N_1$ may be 4 (or 8 if an FFT size is 2048), and $N_2$ may be 1 (or 2 if an FFT size is 2048). The subband is suitable for frequency selective allocation since contiguous PRUs are allocated in a frequency domain. The miniband includes distributed PRUs, and is suitable for frequency diverse allocation.

Each PRU set is mapped to a subband PRU or a miniband PRU (step S510). In this case, mapping can be performed on the basis of the maximum number of PRU sets in the full frequency band and the number of PRU sets allocated to the subband, that is, the number of PRU sets mapped to a subband PRU. That is, mapping can be performed on the basis of the greatest common divisor of the maximum number of PRU sets and ceil (the maximum number of PRU sets/the number of PRU sets mapped to the subband PRU).

Figure 12:
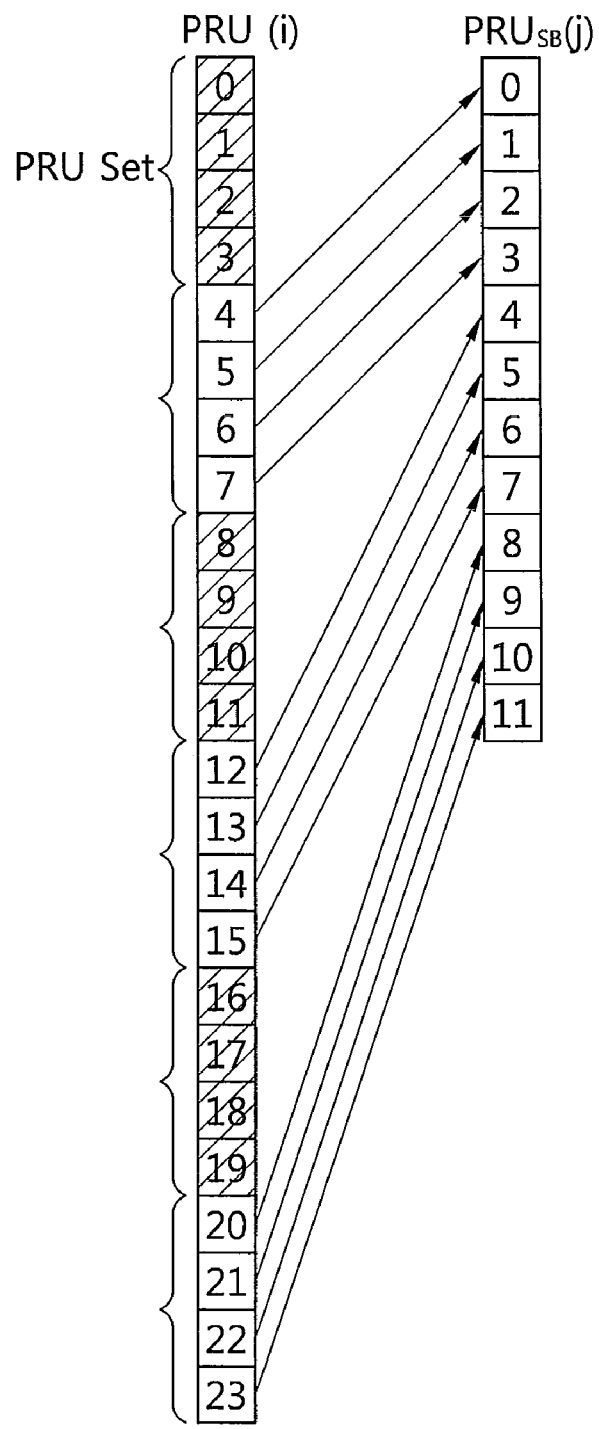
FIG. 12 shows an example of a method of mapping a PRU to a subband PRU according to an embodiment of the present invention.

FIG. 12 shows an example of a method of mapping a PRU to a subband PRU according to an embodiment of the present invention. It this example, BW is 5 MHz, and 24 PRUs are included.

Referring to FIG. 12, the 24 PRUs are divided into a plurality of PRU sets. Each PRU set may include $N_1$ contiguous PRUs. Some of the plurality of PRU sets are allocated to a subband, and are mapped to a subband PRU (i.e., $PRU_{SB}$). The number of PRU sets allocated to the subband is indicated by $K_{SB}$, and the total number of PRUs allocated to the subband is indicated by $L_{SB}$. Therefore, $L_{SB}=N_1*K_{SB}$. The subband PRU is numbered from 0 to ($L_{SB}$−1). For example, if $N_1=4$ and $K_{SB}=3$, then $L_{SB}=12$. When performing mapping between a PRU and a subband PRU, mapping is achieved such that PRU sets allocated to subbands are separated as far as possible in a frequency domain. Accordingly, a frequency diversity gain can be obtained. For example, as shown in FIG. 12, indices 0 to 3 of the $PRU_{SB}$ may be mapped to indices 0 to 3 of the PRU, indices 4 to 7 of the $PRU_{SB}$ may be mapped to indices 8 to 11 of the PRU, and indices 8 to 11 of the $PRU_{SB}$ may be mapped to indices 16 to 19 of the PRU.

Equation 1 below shows a method of mapping a PRU to a $PRU_{SB}$.

$$PRU_{SB}[j]=PRU[i], j=0, 1, \ldots, L_{SB}-1 \quad \text{[Math FIG. 1]}$$

i can be expressed by Equation 2 below.

[Math FIG. 2]

$$i = N_1 \cdot \left\{ \left\lceil \frac{N_{sub}}{K_{SB}} \right\rceil \cdot \left\lfloor \frac{j}{N_1} \right\rfloor + \left\lfloor \left\lfloor \frac{j}{N_1} \right\rfloor \cdot \frac{GCD\left(N_{sub}, \left\lceil \frac{N_{sub}}{K_{SB}} \right\rceil\right)}{N_{sub}} \right\rfloor \right\} \bmod \{N_{sub}\} + \{j\} \bmod \{N_1\}$$

Herein, i denotes an index of a PRU, and j denotes an index of a subband PRU. $L_{SB}$ denotes the number of PRUs allocated for a subband. $N_1$ denotes the number of PRUs included in one subband. $N_{sub}$ denotes the maximum number of PRU sets that can be allocated to the subband, that is, $N_{PRU}/N_1$. $K_{SB}$ denotes the number of PRU sets allocated to the subband. $N_{PRU}$ denotes the total number of PRUs. GCD(a, b) denotes the greatest common divisor of a and b. ⌈ ⌉ denotes a ceil function, and ⌊ ⌋ denotes a floor function. The ceil function returns a rounded up value of a specified number, and the floor function returns a rounded down value of a specified number.

For example, in FIG. 12, $N_1=4$, $N_{sub}=6$, $K_{SB}=3$. In this case, if the index j of the subband PRU is 1, the index i of the PRU is mapped to 1. If the index j of the subband PRU is 4, the index i of the PRU is mapped to 8. If the index j of the subband PRU is 11, the index i of the PRU is mapped to 19.

In addition thereto, i can be expressed by Equations 3 to 6 below.

[Math FIG. 3]

$$i = N_1 \cdot \left\{ \min\left(\left\lceil \frac{N_{sub}}{K_{SB}} \right\rceil, \frac{N_{sub}}{3}\right) \cdot \left\lfloor \frac{j}{N_1} \right\rfloor + \left\lfloor \frac{\left\lfloor \frac{j}{N_1} \right\rfloor \cdot GCD\left(N_{sub}, \min\left(\left\lceil \frac{N_{sub}}{K_{SB}} \right\rceil, \frac{N_{sub}}{3}\right)\right)}{N_{sub}} \right\rfloor \right\} \mod \{N_{sub}\} +$$

$$\{j\} \mod \{N_1\}$$

[Math FIG. 4]

$$i = N_1 \cdot \left\{ \min\left(\left\lceil \frac{N_{sub}}{K_{SB}} \right\rceil, \frac{N_{sub}}{4}\right) \cdot \left\lfloor \frac{j}{N_1} \right\rfloor + \left\lfloor \frac{\left\lfloor \frac{j}{N_1} \right\rfloor \cdot GCD\left(N_{sub}, \min\left(\left\lceil \frac{N_{sub}}{K_{SB}} \right\rceil, \frac{N_{sub}}{4}\right)\right)}{N_{sub}} \right\rfloor \right\} \mod \{N_{sub}\} +$$

$$\{j\} \mod \{N_1\}$$

[Math FIG. 5]

$$i = N_1 \cdot \left\{ \left\lceil \frac{N_{sub}}{\max(K_{SB}, 3)} \right\rceil \cdot \left\lfloor \frac{j}{N_1} \right\rfloor + \left\lfloor \frac{\left\lfloor \frac{j}{N_1} \right\rfloor \cdot GCD\left(N_{sub}, \left\lceil \frac{N_{sub}}{\max(K_{SB}, 3)} \right\rceil\right)}{N_{sub}} \right\rfloor \right\} \mod \{N_{sub}\} +$$

$$\{j\} \mod \{N_1\}$$

[Math FIG. 6]

$$i = N_1 \cdot \left\{ \left\lceil \frac{N_{sub}}{\max(K_{SB}, 4)} \right\rceil \cdot \left\lfloor \frac{j}{N_1} \right\rfloor + \left\lfloor \frac{\left\lfloor \frac{j}{N_1} \right\rfloor \cdot GCD\left(N_{sub}, \left\lceil \frac{N_{sub}}{\max(K_{SB}, 4)} \right\rceil\right)}{N_{sub}} \right\rfloor \right\} \mod \{N_{sub}\} +$$

$$\{j\} \mod \{N_1\}$$

In Equations 3 to 6, i denotes an index of a PRU, and j denotes an index of a subband PRU. $L_{SB}$ denotes the number of PRUs allocated for a subband PRU. $N_1$ denotes the number of PRUs included in one subband. $N_{sub}$ denotes the maximum number of PRU sets that can be allocated to the subband, that is, $N_{PRU}/N_1$. $K_{SB}$ denotes the number of PRU sets allocated to the subband.

Accordingly, when an interval between subbands is maintained to be separated as far as possible in a full frequency band, a frequency diversity gain can be obtained to the maximum extent possible. In particular, by using Equation 1 and Equation 2, the frequency diversity gain can be obtained to the maximum extent possible according to the number KSB of PRU sets allocated to a subband.

Figure 13:
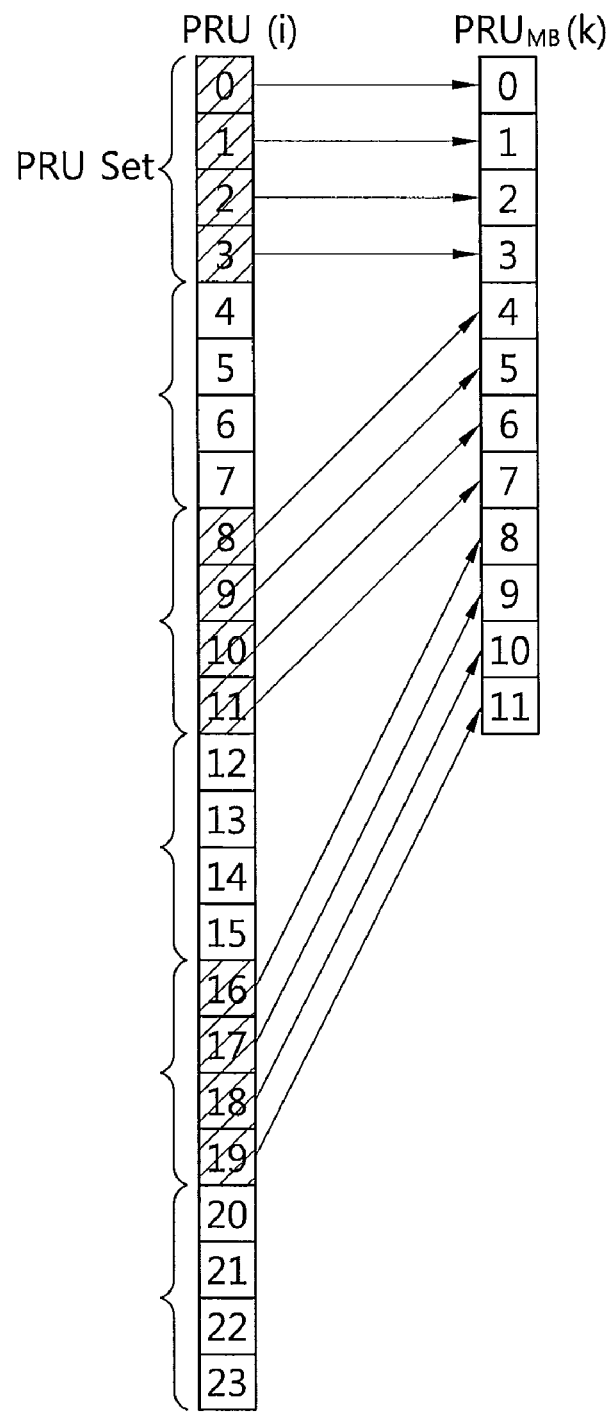
FIG. 13 shows an example of a method of mapping a PRU to a miniband PRU according to an embodiment of the present invention.

FIG. 13 shows an example of a method of mapping a PRU to a miniband PRU according to an embodiment of the present invention. It this example, BW is 5 MHz, and 24 PRUs are included.

Referring to FIG. 13, the 24 PRUs are divided into a plurality of PRU sets. Each PRU set may include $N_1$ contiguous PRUs. Some of the plurality of PRU sets are mapped to a subband, and the remaining parts thereof are allocated to a miniband. A PRU set allocated to the subband is mapped to a subband PRU (i.e., $PRU_{SB}$). A PRU set allocated to the miniband is mapped to a miniband PRU (i.e., $PRU_{MB}$). One subband includes $N_1$ contiguous PRUs. One miniband includes $N_2$ PRUs. $N_1$ may be a multiple of $N_2$. $N_1$ PRUs may be contiguously allocated for the miniband. The number of PRU sets allocated to the subband is indicated by $K_{SB}$, and the total number of PRUs allocated to the subband is indicated by $L_{SB}$. The number of minibands is indicated by $K_{MB}$, and the number of PRUs allocated to the miniband is indicated by $L_{MB}$. That is, $L_{MB}=N_2*K_{MB}$. The miniband PRU is numbered from 0 to $L_{MB}-1$. The total number of PRUs is $N_{PRU}=L_{SB}+L_{MB}$. As shown in FIG. 13, indices 0 to 3 of the $PRU_{MB}$ may be mapped to indices 0 to 3 of the PRU, indices 4 to 7 of the $PRU_{MB}$ may be mapped to indices 8 to 11 of the PRU, and indices 8 to 11 of the $PRU_{MB}$ may be mapped to indices 16 to 19 of the PRU.

Equation 7 below shows a method of mapping a PRU to a $PRU_{MB}$.

$$PRU_{MB}[k] = PRU[i], k=0, 1, \ldots, L_{MB}-1 \quad \text{[Math FIG. 7]}$$

i can be expressed by Equation 8 below.

[Math FIG. 8]

$$i = \begin{cases} \cdot + L_{SB} \\ \overline{N_1} \end{cases} + \left\lfloor \frac{\left\lfloor \frac{k+L_{SB}}{N_1} \right\rfloor \cdot GCD\left(N_{sub}, \left\lfloor \frac{N_{sub}}{K_{SB}} \right\rfloor\right)}{N_{sub}} \right\rfloor \right\} \mod \{N_{sub}\} + \{k+L_{SB}\} \mod \{N_1\}, \quad K_{SB} > 0$$

$$k, \qquad K_{SB} = 0$$

Herein, i denotes an index of a PRU, and k denotes an index of a miniband PRU. $L_{SB}$ denotes the number of PRUs allocated for a subband PRU. $N_1$ denotes the number of PRUs included in one subband. $N_{sub}$ denotes the maximum number of PRU sets, that is, $N_{PRU}/N_1$. $K_{SB}$ denotes the number of PRU sets allocated to the subband. For example, in a case where $N_1=4$, $N_{sub}=6$, $K_{SB}=3$, if an index k of a miniband PRU is 0, the index i of the PRU is mapped to 4. If the index k of the miniband PRU is 5, the index i of the PRU is mapped to 13. If the index k of the miniband PRU is 10, the index i of the PRU is mapped to 22.

In addition thereto, i can be expressed by Equations 9 to 10 below.

[Math FIG. 9]

$$i = N_1 \cdot \left\{ \left[ \frac{N_{sub}}{\max(K_{SB}, 3)} \right] \cdot \left\lfloor \frac{k+L_{SB}}{N_1} \right\rfloor + \left\lfloor \left\lfloor \frac{k+L_{SB}}{N_1} \right\rfloor \cdot \frac{GCD\left(N_{sub}, \left\lceil \frac{N_{sub}}{\max(K_{SB}, 3)} \right\rceil \right)}{N_{sub}} \right\rfloor \right\} \mod \{N_{sub}\} +$$

$$\{k + L_{SB}\} \mod \{N_1\}$$

[Math FIG. 10]

$$i = N_1 \cdot \left\{ \left[ \frac{N_{sub}}{\max(K_{SB,4})} \right] \cdot \left\lfloor \frac{k+L_{SB}}{N_1} \right\rfloor + \left\lfloor \left\lfloor \frac{k+L_{SB}}{N_1} \right\rfloor \cdot \frac{GCD\left(N_{sub}, \left\lceil \frac{N_{sub}}{\max(K_{SB}, 4)} \right\rceil \right)}{N_{sub}} \right\rfloor \right\} \mod \{N_{sub}\} +$$

$$\{k + L_{SB}\} \mod \{N_1\}$$

In Equations 9 to 10, i denotes an index of a PRU, and k denotes an index of a miniband PRU. $L_{SB}$ denotes the number of PRUs allocated for a subband PRU. $N_1$ denotes the number of PRUs included in one subband or PRU set. $N_{sub}$ denotes the maximum number of PRU sets, that is, $N_{PRU}/N_1$. $K_{SB}$ denotes the number of PRU sets allocated to the subband.

Hereinafter, a method of transmitting and receiving data by using the aforementioned subchannelization method will be described.

Figure 14:
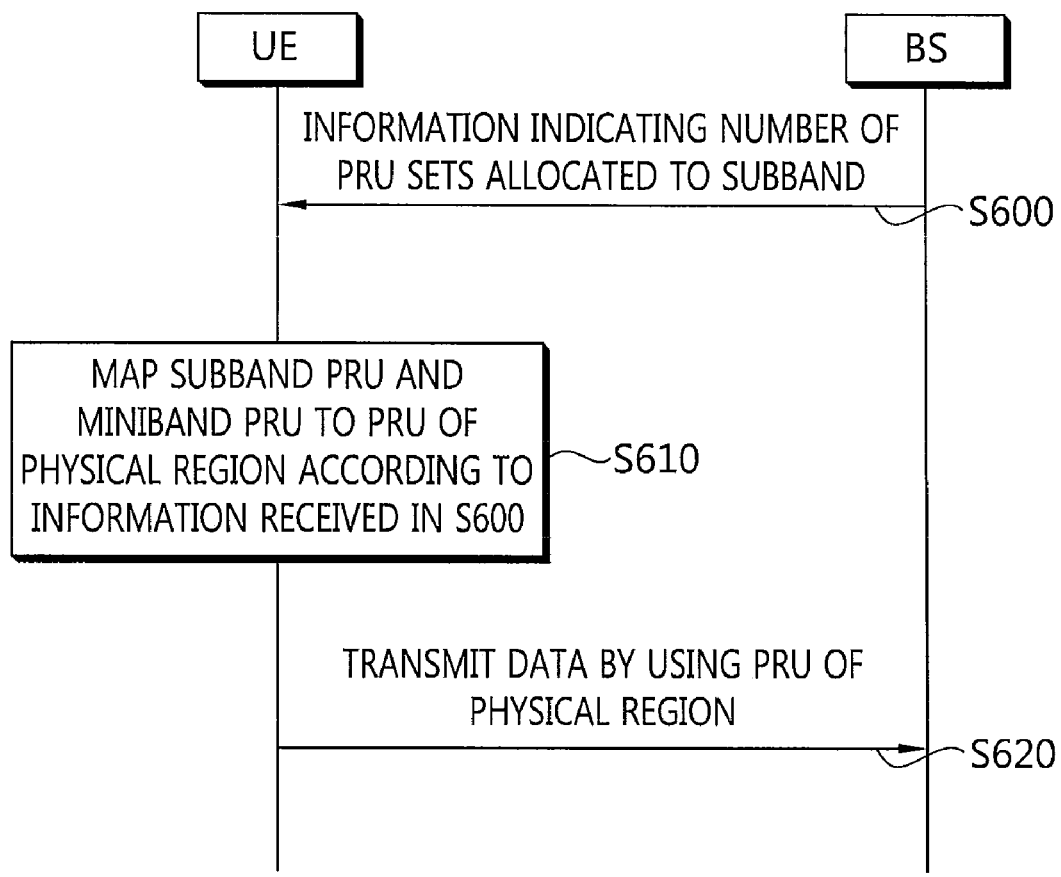
FIG. 14 is a flowchart showing a data transmission method according to an embodiment of the present invention.

FIG. 14 is a flowchart showing a data transmission method according to an embodiment of the present invention.

Referring to FIG. 14, a UE receives information from a BS, and this information indicates the number of PRU sets allocated by the BS to a subband (step S600). The PRU set allocated to the subband implies a PRU set mapped to a subband PRU. The information indicating the number of PRU sets allocated to the subband may be the number of PRU sets allocated to the subband or may be a predetermined count indicating this number.

On the basis of the information received in step S600, the UE maps the subband PRU and the miniband PRU to a PRU of a physical region (step S610). A process of mapping the subband PRU and the miniband PRU to the PRU of the physical region can be performed with reference to FIG. 11 to FIG. 13.

The UE transmits uplink data to the BS by using the PRU of the physical region (step S620).

Figure 15:
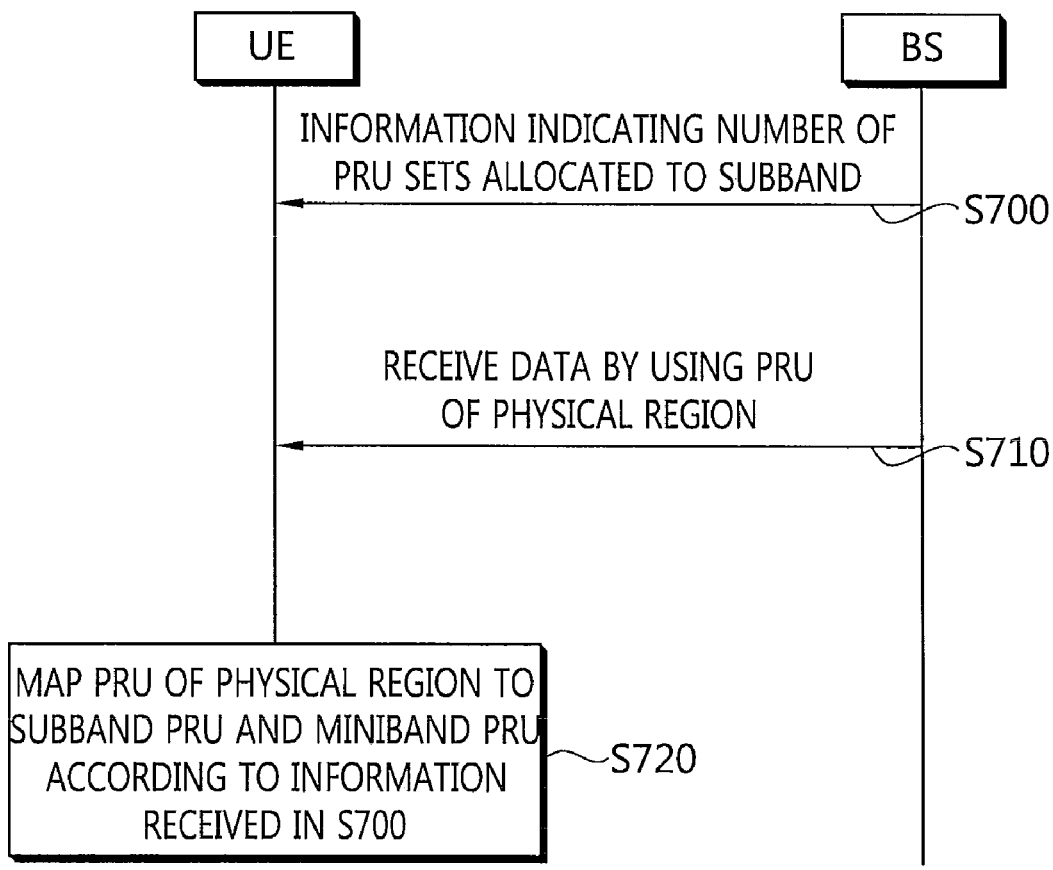
FIG. 15 is a flowchart showing a data processing method according to an embodiment of the present invention.

FIG. 15 is a flowchart showing a data processing method according to an embodiment of the present invention.

Referring to FIG. 15, a UE receives information from a BS, and this information indicates the number of PRU sets allocated by the BS to a subband (step S700). The PRU set allocated to the subband implies a PRU set mapped to a subband PRU. The information indicating the number of PRU sets allocated to the subband may be the number of PRU sets allocated to the subband or may be a predetermined count indicating this number.

The UE receives downlink data from the BS by using a PRU of a physical region (step S710).

On the basis of the information received in step S700, the UE maps the PRU of the physical region to the subband PRU and the miniband PRU (step S720). A process of mapping the PRU of the physical region to the subband PRU and the miniband PRU can be performed with reference to FIG. 11 to FIG. 13.

Figure 16:
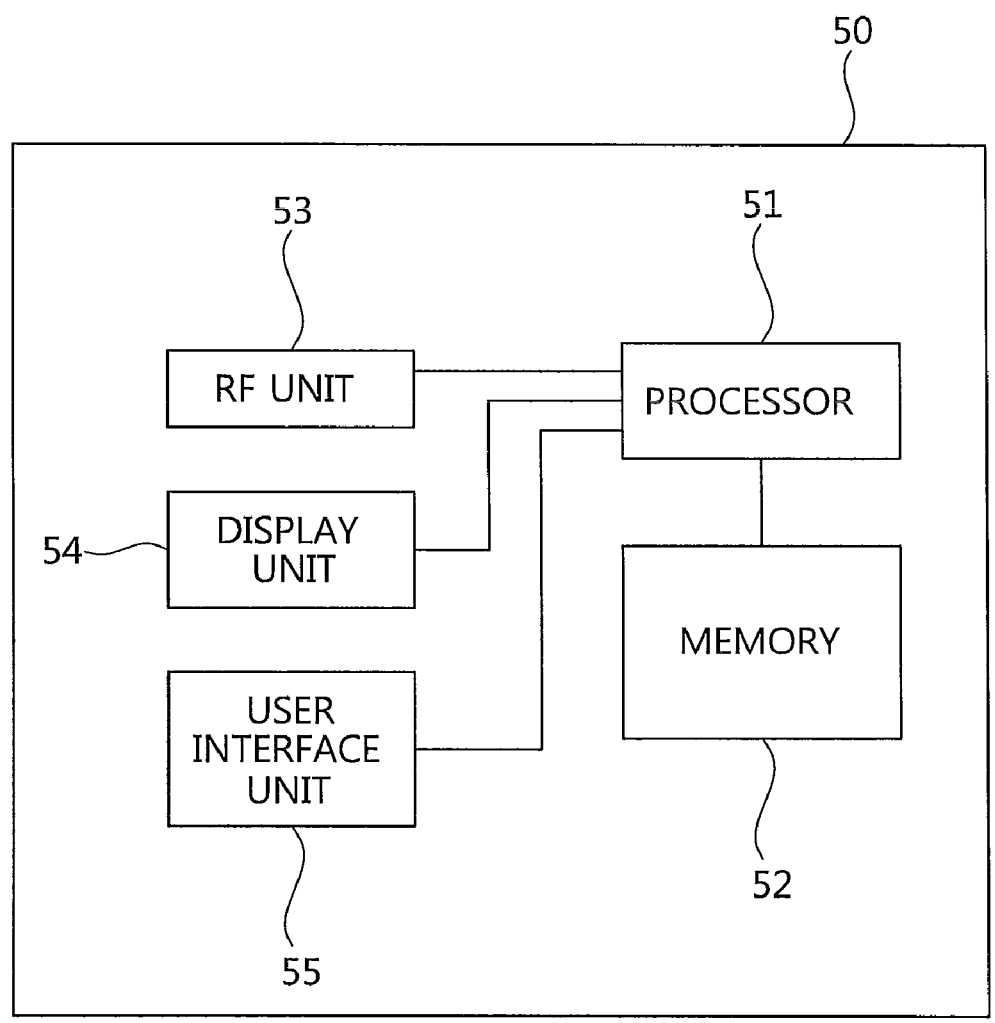
FIG. 16 is a block diagram showing a user equipment according to an embodiment of the present invention.

FIG. 16 is a block diagram showing a UE according to an embodiment of the present invention.

Referring to FIG. 16, a UE 50 includes a processor 51, a memory 52, a radio frequency (RF) unit 53, a display unit 54, and a user interface unit 55. The memory 52 is coupled to the processor 51 and stores an operating system of the UE, applications, and general files. The display unit 54 displays a variety of information of the UE 50 and may use a well-known element such as a liquid crystal display (LCD), an organic light emitting diode (OLED), etc. The user interface unit 55 can be configured with a combination of well-known user interfaces such as a keypad, a touch screen, etc. The RF unit 53 is coupled to the processor 51 and transmits and/or receives radio signals. The processor 51 is configured to receive information indicating the number of physical resource unit (PRU) sets allocated to a subband from a BS, and to map PRUs of a physical region to a subband PRU or a miniband PRU in a granularity of the PRU set according to the received information. In this case, the subband PRU is allocated with at least one subband comprising a first number of contiguous PRUs, the miniband PRU is allocated with at least one miniband comprising a second number of PRUs, and the PRU set comprises PRUs whose number is equal to the number of PRUs included in one subband.

According to the proposed embodiments, subchannelization can be effectively achieved while maintaining a frequency selective scheduling gain and a frequency diversity gain to the maximum extent possible. In addition, a signaling overhead between a user equipment and a base station can be reduced.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the scope of the protection.

What is claimed is:

1. A method of subchannelization, comprising:
   receiving information indicating the number of physical resource unit (PRU) sets allocated to a subband from a base station; and
   mapping PRUs of a physical region to a subband PRU or a miniband PRU in a granularity of the PRU set according to the received information,
   wherein the subband PRU is allocated with at least one subband comprising a first number of contiguous PRUs, the miniband PRU is allocated with at least one miniband comprising a second number of PRUs, and the PRU set comprises PRUs whose number is equal to the number of PRUs included in one subband.

2. The method of claim 1, wherein the information is the number of PRU sets allocated to the subband or a predetermined count indicating this number.

3. The method of claim 2, wherein the predetermined count is expressed with a bit-stream.

4. The method of claim 3, wherein a length of the bit-stream is determined based on a frequency bandwidth.

5. The method of claim 1, wherein the information is received through a broadcast channel.

6. The method of claim 1, wherein the information is received through a superframe header (SFH).

7. The method of claim 1, further comprising performing permutation on the miniband PRU in a PRU granularity.

8. A data transmission method of a user equipment in a wireless communication system, the method comprising:
   receiving information indicating the number of PRU sets allocated to a subband from a base station;
   mapping a subband PRU and a miniband PRU to PRUs of a physical region in a granularity of the PRU set on the basis of the received information; and
   transmitting uplink data by using the PRU of the physical region,
   wherein the subband PRU is allocated with at least one subband comprising a first number of contiguous PRUs, the miniband PRU is allocated with at least one miniband comprising a second number of PRUs, and the PRU set comprises PRUs whose number is equal to the number of PRUs included in one subband.

9. A data processing method of a user equipment in a wireless communication system, the method comprising:
   receiving information indicating the number of PRU sets allocated to a subband from a base station;
   receiving downlink data from the base station by using PRUs of a physical region; and
   mapping the PRUs of the physical region to a subband PRU and a miniband PRU in a granularity of the PRU set on the basis of the received information,
   wherein the subband PRU is allocated with at least one subband comprising a first number of contiguous PRUs, the miniband PRU is allocated with at least one miniband comprising a second number of PRUs, and the PRU set comprises PRUs whose number is equal to the number of PRUs included in one subband.

10. The data processing method of claim 9, further comprising performing permutation on the miniband in a PRU granularity.

11. A user equipment comprising:
    a radio frequency (RF) unit for transmitting and receiving a radio signal; and
    a processor operatively coupled to the RF unit and configured to:
    receive information indicating the number of physical resource unit (PRU) sets allocated to a subband from a base station; and
    map PRUs of a physical region to a subband PRU or a miniband PRU in a granularity of the PRU set according to the received information,
    wherein the subband PRU is allocated with at least one subband comprising a first number of contiguous PRUs, the miniband PRU is allocated with at least one miniband comprising a second number of PRUs, and the PRU set comprises PRUs whose number is equal to the number of PRUs included in one subband.

* * * * *